Aug. 12, 1924.
F. H. BEST
TESTING APPARATUS
Filed Aug. 9, 1920
1,504,319
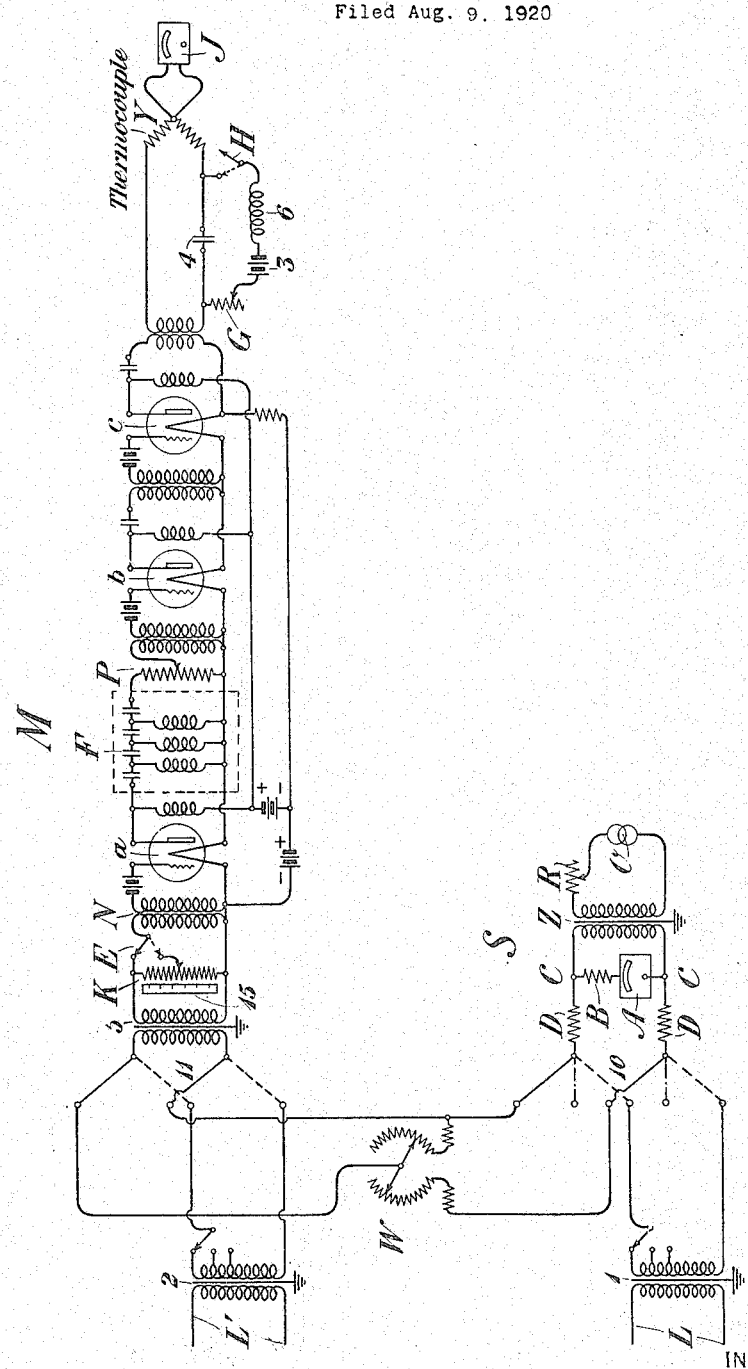
INVENTOR
*F. H. Best*
BY
ATTORNEY Patented Aug. 12, 1924.

1,504,319

UNITED STATES PATENT OFFICE.

FRED H. BEST, OF WESTFIELD, NEW JERSEY, ASSIGNOR TO AMERICAN TELEPHONE AND TELEGRAPH COMPANY, A CORPORATION OF NEW YORK.

TESTING APPARATUS.

Application filed August 9, 1920. Serial No. 402,118.

*To all whom it may concern:*

Be it known that I, FRED H. BEST, residing at Westfield, in the county of Union and State of New Jersey, have invented certain Improvements in Testing Apparatus, of which the following is a specification.

This invention relates to testing apparatus and is concerned particularly with methods of and means for measuring the electrical influence of one transmission circuit on another. It is described herein with particular reference to telephone lines, but it is to be understood that it is not thus limited in its application.

When several transmission lines parallel each other, there is inductive interference between them, which interference is generally minimized by means of transposition of the wires. Due to certain irregularities, however, there generally remains some interference, which, if below a stipulated maximum, is unobjectionable. It is the primary object of this invention to provide methods of and means for determining the extent of the interference of one line with another.

A good understanding of the invention may now be had from the following description of one manner of practicing the invention and one form of apparatus embodying the same, reference being had to the accompanying drawing showing the apparatus and circuits in diagrammatic view.

The apparatus shown in the drawing comprises a sending circuit S for supplying current to the disturbing transmission line L and a measuring circuit M for determining the current induced in the disturbed line L'. The sending circuit comprises an oscillator O for generating a band of frequencies, say from 500 to 1500 cycles, which oscillator is connected in series with a resistance R which is variable, so that the output of the oscillator may be regulated. A transformer Z serves to associate the oscillator with resistances D which constitute an artificial line, the purpose of which is to reduce reflection losses, as explained hereinafter.

A milammeter A is bridged across the terminals of the secondary of the transformer Z, a resistance B being connected in series with the meter, so that the same serves as a voltmenter for indicating the potential impressed on the artificial line D. A switch 10 serves, when in its dotted position, to associate the sending circuit with the disturbing line L, a transformer 1 being provided to associate the contacts of the line with the contacts of the switch. The number of turns in the one winding of the transformer 1 may be varied by means of a movable contact finger so that the impedance of the line L, as viewed from the sending circuit, may be made equal to that of the artificial line D. Reflection losses between the sending circuit and the line are thus avoided.

The measuring circuit M comprises a transformer 5 for associating the surrent whose value is to be determined with a potentiometer K. The variable contact of this device is associated by means of a switch E with the input transformer N of a three-stage amplifier composed of electron tubes *a*, *b* and *c*. When switch E is in the full line position the full drop of potential in K is impressed on the amplifier, but when in the dotted position, only a part of the drop is impressed thereon, depending upon the position of the variable contact. A scale 15 serves to indicate the fraction of the full voltage impressed in the amplifier. The output current of the amplifier flows through the heating element of a thermo-couple Y, the D. C. terminals of which are connected to a meter J which is an accurate direct current measuring instrument. Alternating current which enters the measuring circuit causes thus a deflection of meter J and the extent of the deflection per unit of current impressed on the circuit may be adjusted by means of a potentiometer P interposed between the first and second stage of the amplifier. A filter designated F is associated with the measuring circuit for the purpose of suppressing currents of less than 500 cycle frequency. The measuring circuit may be associated with the disturbed line L' by means of a switch 11, transformers 2 and 5 being provided for the purpose of equalizing the impedances of the line L' and the circuit M, in order to avoid reflection losses therebetween.

To make a test, the operator connects the sending circuit to the disturbing line by throwing switch 10 to the dotted position, and associates the measuring circuit with the disturbed line by operating switch 11 to the dotted position. He regulates resistance R until the pointer of meter A stands at a predetermined value, thus showing that a certain designated voltage is impressed on the line. He then operates switch E to the full line position and adjusts the potentiometer P until the pointer of meter J stands at a certain predetermined position, such, for example, as full scale deflection. The current which is entering the measuring circuit is composed of two portions, (a) the portion due to interference from line L, herein designated cross-talk current, and (b) the part which is due to extraneous sources, herein designated noise current. The filter F serves to prevent a large part of the noise current from having any effect on meter J for the reason that the frequency of the line noise is generally below 500 cycles. Nevertheless, the effects of the two portions of the current in the line L' on the reading of meter J are often of the same order of magnitude.

In order to observe the effect of the line noise current on meter J, the operator throws the switch 10 to the dot and dash position, so that the sending circuit is disconnected from the line L and the indication of meter J falls to a value which is due to the noise current alone. The operator takes note of this reading of the meter and then disconnects the measuring circuit from line L' by opening switch 11. The indication of the meter now falls to zero for the reason that there is no current flowing through potentiometer K. The operator then closes a switch H which is associated with the heating curcuit of the thermo-couple and which serves to connect a battery 3 in series with the said circuit, thus causing a flow of current therethrough, the value of which the operator regulates by means of a resistance G until the deflection of the meter is restored to the reading obtained with the noise current alone.

The operator now associates the sending circuit with the measuring circuit by throwing switches 10 and 11 to their full line positions taking care that the potential of the source is the same as before, by noting the reading of meter A. The constant impedance shunt W is interposed between the contacts of the said switches for the purpose of introducing an attenuation loss equal to that caused by transformers 1 and 2 when lines L and L' were connected to circuits S and M, respectively. The operator then throws the switch E to the dotted position and adjusts the position of the variable contact of the potentiometer until the reading of meter J is restored to full scale deflection. This deflection is due to two currents, first, the direct current from battery 3 which causes a deflection equal to that of the line noise current, and secondly, an alternating current which causes a deflection equal to that of the cross-talk current. The condenser 4 in the heating circuit of the thermo-couple and the inductance 6 are provided for the purpose of preventing the flow of alternating current through the battery circuit. The impedance of the heating circuit is therefore practically the same for either position of switch H.

The alternating current which is now flowing through the measuring circuit is equal in value to the cross-talk current, and the position of the variable contact at E indicates the fraction it forms of the total current from the source. The scale 15 is calibrated to give the value of this current in cross-talk units, i. e. the number of millionths of the current originally impressed on the disturbing line.

Although only one form of method of practicing the invention and only one form of apparatus embodying the same are shown and described herein, it is to be understood that various changes and modifications may be made therein within the scope of the following claims, without departing from the spirit and scope of the invention.

What is claimed is:

1. In an apparatus of the character described, a measuring circuit, an amplifier therein responsive to potentials impressed on said circuit, a thermal device, a heating circuit therefor responsive to the output current of said amplifier, a translating device responsively associated with said thermal device, and a source of current associated with said heating circuit for causing a response of said translating device irrespective of the potential impressed on said measuring circuit.

2. In an apparatus of the character described, a measuring circuit, a source of current, a first connecting device for at times associating said source with a disturbing transmission line, a second connecting device for at times associating said measuring circuit with a disturbed line, a third connecting device for at times associating said source with said measuring circuit, said first and third connecting devices being arranged when operative, to cause equal flows of current from said source, and means associated with said third connecting device for introducing therein an attenuation equal to that of the first and second connecting devices.

3. In an apparatus of the character described, a measuring circuit, a conductor, means for associating a variable portion of said conductor with said measuring circuit, a source of current of a plurality of frequencies, a connecting device for at times associating said source with a disturbing transmission circuit, another connecting device for at times associating said source with said conductor, said connecting devices being arranged to present equal impedances to the flow of current from said source, and means for at times associating the conductor with a disturbed line, said means having an impedance, as viewed from the conductor, equal to that of the said other connecting device.

4. In an apparatus of the character described, a measuring circuit, a translating device associated with said circuit and responsive to the energy impressed on said circuit, an auxiliary source of current associated with said circuit for causing deflection of said translating device irrespective of the energy impressed on said measuring circuit, a source of current of predetermined magnitude and composed of a plurality of frequencies, connecting devices for associating said source with a disturbing transmission circuit and for connecting said measuring circuit with a circuit disturbed by said disturbing circuit, means for at times associating said source with said measuring circuit, said means having the same attenuation as said connecting devices, and variable means for reducing the energy impressed by said source on said measuring circuit.

5. In an apparatus of the character described, a measuring circuit, a translating device associated with said circuit and responsive to the energy impressed on said circuit, means for regulating the extent of deflection of said translating device per unit of energy impressed upon said measuring circuit, an auxiliary source of current associated with said circuit for causing deflection of said translating device, irrespective of the energy impressed on said measuring circuit, a source of current of predetermined magnitude and composed of a plurality of frequencies, connecting devices for associating said source with a disturbing transmission circuit and for connecting said measuring circuit with a circuit disturbed by said disturbing circuit, means for at times associating said source with said measuring circuit, said means having the same attenuation as said connecting devices, variable means for reducing the energy impressed by said source on said measuring circuit, and an indicating device associated with said last mentioned variable means for indicating the ratio of the current entering said measuring circuit with said variable means in adjusted position relatively to the current entering the same with said variable means in normal position.

6. The method of measuring the electrical influence of one circuit on another, which consists in determining the difference in the effect on a translating device caused by the current in said other circuit with the said one circuit in energized condition and in deenergized condition, respectively.

7. The method of ascertaining the effectiveness of one circuit in transferring energy to another, which consists in associating energy of predetermined magnitude with the said one circuit, causing the resultant total amount of energy in the said other circuit to actuate an indicating device, disassociating said source from said one circuit, and determining the effect on said indicating device of the energy remaining in the other circuit.

8. The method of measuring the inductive influence of a disturbing transmission line on a disturbed transmission line, which consists in creating in the disturbing line a flow of current of pre-determined magnitude composed of a plurality of frequencies, causing the current existing in the disturbed line when said first mentioned current flows in the disturbing line to traverse an electrical conductor, noting the effect of said current on said conductor, discontinuing the current flow in the disturbing line and indicating the effect on said conductor of the current remaining in the disturbed line, causing a current flow in the conductor equal in effect thereon to said first mentioned current when flowing in the disturbed line, and ascertaining the fraction of the last mentioned current flow having an effect on the conductor equal to the difference between the first and second mentioned effects on the conductor.

9. The method of measuring the current induced in one transmission circuit by the current in another, which consists in causing in the disturbing transmission circuit a flow of current of pre-determined value and composed of a plurality of frequencies covering a pre-determined range, associating a translating device with the disturbed transmission circuit and causing the indication of said translating device to assume a certain designated value, discontinuing said flow of current in said disturbing transmission circuit and noting the remaining indication of the said translating device, disassociating said device from said disturbed circuit and associating a source of energy therewith so that the indication thereof is restored to the said remaining value, associating the first-mentioned source with said translating device simultaneously with said auxiliary source, and reducing the effect of said first source on said device so that the deflection thereof is restored to the said designated value.

10. The method of measuring cross-talk from a disturbing line to a disturbed line, which consists in applying a tone current to the disturbing line and measuring the response in the disturbed line by means of a circuit at its end, and then applying the same source of tone current through a calibrated adjustable impedance device directly to said measuring circuit.

11. The method of measuring cross-talk between a disturbing line and a disturbed line, which consists in first measuring the effect in the disturbed line of noises from other sources than the disturbing line, and then measuring the additional effect caused by a tone current applied to the disturbing line.

In testimony whereof, I have signed my name to this specification this 6th day of August, 1920.

FRED H. BEST.